Sept. 5, 1967 R. V. BRAUN ET AL 3,340,138
PROCESS FOR SEPARATION OF SPRINGWOOD
AND SUMMERWOOD OF CONIFEROUS WOODS
Filed March 22, 1965 3 Sheets-Sheet 1

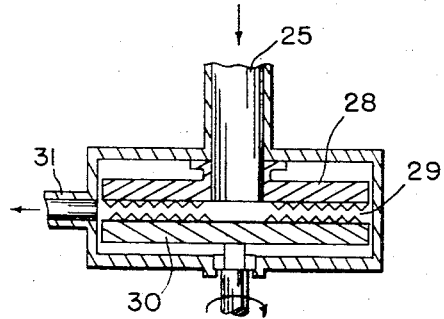
FIG. 4
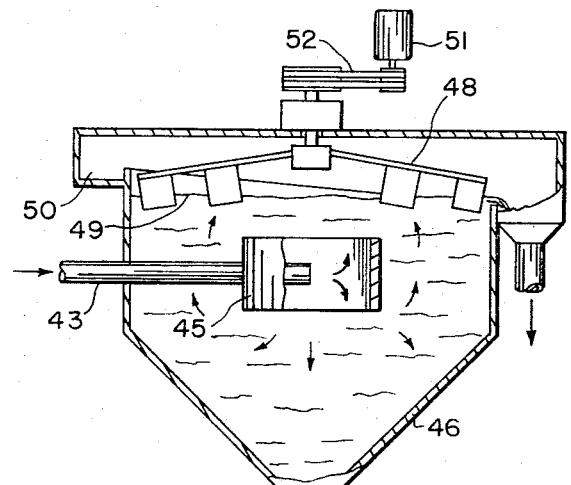
FIG. 5
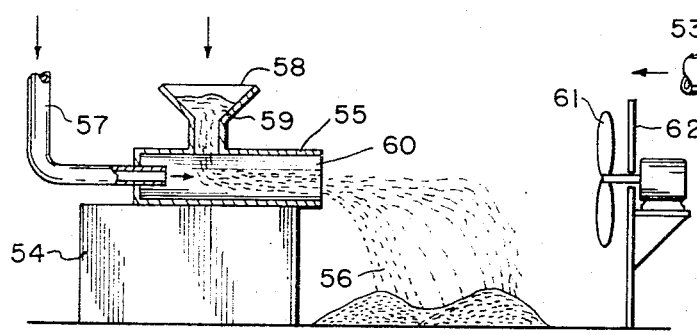
FIG. 6   SPRINGWOOD   SUMMERWOOD
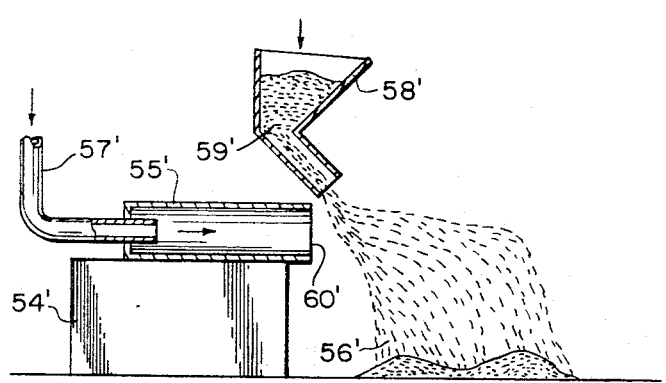
FIG. 7   SUMMERWOOD   SPRINGWOOD 3,340,138
PROCESS FOR SEPARATION OF SPRINGWOOD
AND SUMMERWOOD OF CONIFEROUS WOODS
Ralph V. Braun, Neenah, Wis., William D. Lloyd, Kapuskasing, Ontario, Canada, and Byron R. Terry, Neenah, Wis., assignors to Kimberly-Clark Corporation, Neenah, Wis., a corporation of Delaware
Filed Mar. 22, 1965, Ser. No. 441,815
3 Claims. (Cl. 162—28)

This application is a continuation-in-part of our copending application Ser. No. 289,040, filed June 19, 1963, now abandoned.

This invention relates to the separation of the springwood and summerwood constituents of coniferous woods. Particularly the invention relates to the provision of such springwood and summerwood substantially independently of each other so that each may be subjected to separate pulping procedures.

In essence we have found that coniferous woods have characteristics which permit their separation into a mixed mass of springwood wood and summerwood wood fragments by various mechanical means without any significant fiberizing, and that the mixed mass of substantially springwood and substantially summerwood wood fragments are responsive to separation into fractions by density difference classifiers to provide a very high percentage of springwood wood in one fraction and a very high percentage of summerwood wood in another fraction; and that a density difference classification in the particular form of a sink-float separation in aqueous media is very effective and easily operated. The result thus is that coniferous woods which normally float in water are separated into fractions, one of which floats and one of which sinks.

It is known to separate springwood fibers and summerwood fibers from coniferous wood pulps into fiber fractions. One approach to procuring fibers of springwood separately from the fibers of summerwood is described in United States Patent 3,085,927. The impracticality of separately removing alternate thin springwood and summerwood layers from a log is noted in that patent. The approach of the patentee, accordingly, is to pulp the springwood and summerwood together; by the pulping actions, including beating of the pulp, water is introduced into the lumens of the fibers. The effect of this, due to the larger lumens of the springwood fibers, is to cause the springwood fibers to have a lesser apparent specific gravity in water than the summerwood fibers. This factor plus the less compact shape of the springwood fibers, causes the springwood fibers to sink more slowly in water. The patentee effects separation of the springwood fibers from the summerwood fibers by sedimentation or centrifugal techniques, for example. Limitations of the process, as the patentee notes, include large power requirements at the low required slurry consistencies. Additionally, the degree of separation into springwood fiber and summerwood fiber components decreases with increasing consistency of the slurry. Also, for effective separation a plurality of passes of a centrifuge is desirable, resulting in increased time and power consumption; even then some portions of the pulp are apparently not subject to separation and are discarded.

It is a primary object of this invention to provide a commercially useful method for separating coniferous wood into two groups of wood fragments, one of which groups consists substantially of springwood and the other of which groups consists substantially of summerwood, and each of which groups may independently be subjected, in part or as a whole, to a pulping operation to reduce the wood to the fibrous state.

A principal object of this invention is to provide a mechanical procedure for the separation of the springwood from the summerwood of coniferous woods, and which process is effective to provide the wood of either designation in an essentially unfiberized condition and suitable for pulping.

In essence, our invention involves basically a two-step process for attainment of the springwood wood fragments and the summerwood fragments. The first step is directed to separating the springwood and the summerwood of the coniferous wood by mechanical action, the action being such that a mixed mass of springwood fragments and summerwood fragments is formed. The second step is directed to separation of the springwood fragments from the summerwood fragments of the mixed mass on the basis of the density difference between the two types of fragments. Considerable variation is possible both in the procuring of the mixed mass, the dimensions and shape of the fragments from the mass, and in the separation step.

The invention will be more fully understood by reference to the following detailed description and accompanying drawings wherein:

FIG. 4 illustrates one type of wood splintering equipment useful in the practice of the invention in the equipment arrangement of FIG. 3;

FIG. 5 illustrates one embodiment of sink-float apparatus useful in the arrangement of FIG. 3;

FIG. 6 indicates one alternative apparatus arrangement for the separation of the noted mass into springwood and summerwood as wood ready for pulping;

FIG. 7 is another apparatus arrangement effective to accomplish springwood-summerwood fragment separation.

Figure 1:
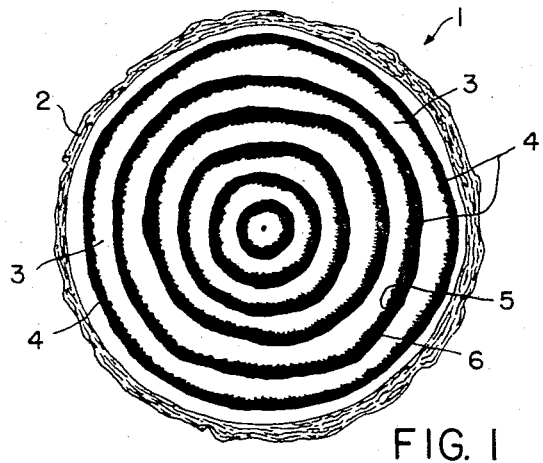
FIG. 1 represents a cross-section of a log of coniferous wood with springwood and summerwood layers particularly illustrated.

In FIG. 1 the numeral 1 generally designates a log which has been cut from a coniferous tree, the view in FIG. 1 being an end view of the log. The numeral 2 denotes the bark of the log. In the growth of coniferous trees, that growth which takes place early in the growing season is termed springwood. The growth which takes place late in the growing season is termed summerwood. Springwood is characterized by fibers having relatively thin walls, are usually of polygonal shape in cross-section, and the fibers have relatively large lumens; in contrast, summerwood is characterized by fibers having thicker walls somewhat elliptical in cross-section, and the lumens are relatively small. The springwood tends to be lighter in color to the eye and is usually distinguishable visually from the visually darker summerwood. In FIG. 1 the springwood zones are indicated at 3 and the summerwood zones at 4. Also, it should be noted that, while in FIG. 1 the springwood zones measured radially are of greater dimension than the summerwood zones, such zone dimensions vary and the radial dimension may be greater for the summerwood; in many instances of wood used commercially for pulping the zones are of equal dimension and many more annual rings, constituted by an adjacent springwood and summerwood zone, may be present.

The numeral 5 designates a first line of cleavage between the springwood and summerwood zones; the numeral 6 designates a line of cleavage between the summerwood and next springwood zone. These lines of cleavage are somewhat irregular. We have found, however, that the springwood may be quite well separated from the summerwood along these and other similar lines of cleavage to provide the springwood fragments and summerwood fragments already mentioned. One method of accomplishing this is illustrated in FIG. 3.

Figure 3:
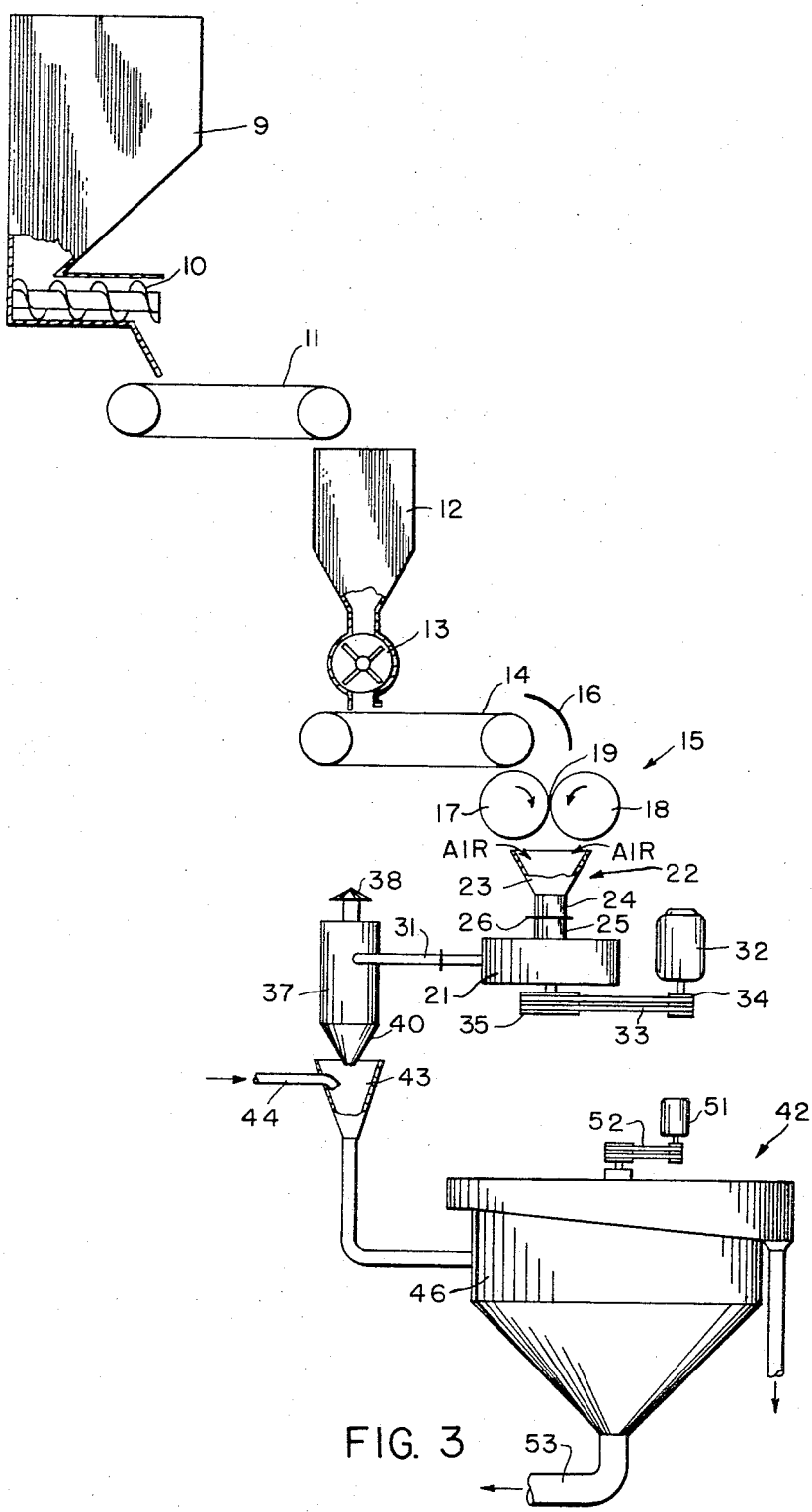
FIG. 3 is a schematic representation of an equipment arrangement for carrying out the process illustrated in the flow chart of FIG. 2.

In FIG. 3 the numeral 9 denotes a chip bin. Conventional chips may be supplied to this bin. Such chips are provided by first debarking the log 1 and then feeding the debarked log to the chipping device. Such devices are well known and act angularly to the axis of a log fed to the device to slice chips from the log end. Such chips usually have a length in the grain direction which varies from ½ inch to about 1½ inches and a transverse dimension of about ⅛ inch to ¼ inch. These chippers are well known and no further description is considered necessary. Plural cleavage lines comprise chip width (about 1").

Chips are fed from bin 9 by screw feeder 10 to chip belt conveyor 11. Conveyor 11 discharges into chip surge bin 12. The purpose of surge bin 12 is to provide a substantially constant height of chips to maintain rotary feeder 13 supplied. Feeder 13 meters the chips to conveyor 14 which carries the chips to a rotary press generally designated at 15. Press 15 includes a guide shield 16 for directing the chips to rolls 17, 18 and the pressure nip 19 formed between the rolls.

The rolls 17, 18 in their rotation in the direction indicated by the arrows cause a preliminary fracture of the chips, particularly along the natural lines of cleavage formed between the springwood and summerwood, that is, the lines designated at 5 and 6 in FIG. 1. The action of the press is that of light crushing or cracking with very little, if any, complete separation. The pressing also fractures the wood somewhat within the springwood and summerwood zones, particularly if such zones are of a large radial dimension in the original log and chip.

The nip 19 communicates with a chip splinter device designated at 21. The communication is through the chute 22 which is provided with an upper conical guard portion 23 and a lower cylindrical portion 24. The inlet 25 of the chip splinter device 21 is suitably coupled at 26 to the cylindrical portion 24.

The chip splinter device 21 serves to reduce the cracked chips to fragments which are substantially springwood or summerwood fragments. It also serves to subdivide the cracked chips within springwood portions and within summerwood portions where the pressing operation has provided lines of weakness in the springwood or in the summerwood. The fragments resulting from the chip breakdown by the combination of press and splintering actions are commonly of about toothpick or matchstick dimension in cross-section. In effect, the chip splinter device completes the cracking procedure by a fragmentizing action.

The pressing preferably is not so great as to materially compress the chips; compression, which for example, materially flattens the chips and increases chip dimension, is not necessary. The specific procedure of springwood-summerwood separation, as described herein, is not affected adversely by excess pressure, but for some pulping purposes it is desirable to avoid excess pressures on the wood structure embodying the cellulose fibers.

The chip splintering device may be any unit which will affect the splinter-off of the fragments. A disc mill or a hammermill, for example, serves the purpose. One useful device is illustrated in FIG. 4. The crushed or cracked chips are fed centrally of the upper toothed stationary plate 28 to the spacing 29 bounded on the lower side by the rotary toothed plate 30. The rotation of this lower plate occasions the drawing of air through the chute 22 and the splintered material is carried outwardly of the plate periphery through housing outlet 31 by the air blast. The throughput is preferably continuous and clogging is preferably avoided to minimize damage to the fragments. The rotational speed is not critical; we have found 1800 r.p.m. satisfactory. The lower plate is driven in any suitable manner (FIG. 7) as by motor 32, belts 33 and pulleys 34, 35. Such disc mill, as well as hammermill, devices are of themselves known for the purpose of cracking chips and are termed chip crackers.

The air blast carrying the splintered chips is delivered to a cyclone 37. The outlet 31 of the splintering device has a tangential connection with cyclone 37 of the usual type. The air is passed out through cyclone upper outlet 38 carrying with it some fines, and the splintered fragments fall to the bottom outlet 40. Fragment length is not critical. Fragments of toothpick or matchstick size in cross-section which pass a ½ inch screen but are retained on a 1/32 inch screen are effective in the process.

A float-sink separation device is provided at 42 and communicates with cyclone bottom outlet 40 through conduit 43. Conduit 43 is coupled at its upper end to a source of liquid supply indicated generally at 44. This liquid serves to carry the chips to the separation device 42.

The device 42, shown in greater detail in FIG. 5, is of conventional construction and includes an open ended feed well 45 in vessel 46. The conduit 43 from the cyclone 37 directs the flow to the feed well. The vessel 46 is provided with a slowly revolving rake 48 of conventional construction for removal of fragments floating on the liquid surface 49. The rake is driven by motor 51 through belts 52. An overflow launder is provided at 50.

The fragments fed to the well 45 are subjected to mixing within the well where there is a degree of turbulence due to the inflow. Some springwood fragments float upwardly immediately; others are carried downwardly with the sinking summerwood below the well and then move upwardly in the direction indicated by the arrows. The summerwood sinks and is withdrawn through the bottom outlet 53 of the separator.

Separation on the continuous basis described is most effective on natural wood. In such wood the moisture content is about 45 to 55% and the effective density of the summerwood is considerably greater than that of water, while the springwood at the same moisture content has a density considerably less than that of water. It is, of course, not necessary that the liquid medium of the separator be water; in many instances sulfite liquor of a density of about 1.08 to 1.1 is useful as it has a density intermediate that of the springwood and summerwood and such may be used to sharpen the separation depending upon the particular wood; generally water alone is satisfactory.

The separation, however, may be effected independently of the float-sink procedure described above. One method is illustrated in FIG. 6 and another in FIG. 7.

In FIG. 6 a table 54 mounts a tube 55 which preferably projects somewhat from the table over a receiving zone 56. A conduit 57 is connected rearwardly to the table 55 for delivery of an air blast into the tube. A hopper 58 adapted to be provided with a mass of the mixed fragments of springwood and summerwood is designated at 59. Opposing the open end 60 of the tube is a fan 61 carried on backing 62. Air delivered through the tube imparts to the fragments velocity. The tube is made sufficiently long so that substantially uniform velocity is imparted to all fragments at the tube opening. By reason of the greater density of the summerwood fragments and consequently greater momentum, they will be carried a greater distance against the air blast of the fan and will fall under the influence of gravity close to the fan. The less dense springwood fragments having less momentum will fall more closely to the tube mouth. Such procedure has proved effective though a sink-float separation is superior as it permits optimum efficiency in one pass of the equipment. However, the arrangement of FIG. 6 is independent of water content of the wood for practical purposes.

In FIG. 7 the arrangement is somewhat similar and corresponding parts are designated with the same numerals as in FIG. 6 but are primed. In this instance the air blast through conduit 57' contacts the fragments from the hopper 59' as the blast exits at 60'. The velocity imparted to the more dense summerwood fragments is lower than the velocity imparted to the less dense springwood and, accordingly, the springwood is carried a relatively greater distance while the summerwood drops closely to the tube opening.

Other alternative arrangements may be employed. For example, separation has been effected with a conventional air table separator of commercial construction. It is not considered necessary to further illustrate such apparatus in view of the many types available and the provision of means which are clearly not dependent upon wood water content.

Surprisingly, we have found that the initial water content of the wood is not a basic or governing factor even in sink-float procedures in water. This is apparently for the reason that the summerwood requires much less take-on of water than does the springwood in order for the separation to take place. Our findings indicate that about 200% of its own weight of water is required for springwood to sink; in contrast, summerwood need only contain about 50% of its own weight. Confirmation of this has been made by first separating springwood and summerwood fragments, then air drying the fragments to about 10% moisture. The fragments were then returned to water. The time period for best separation is increased but within 5 minutes 78 to 80% of the summerwood had sunk while 97% of the springwood portion floated. In general, we contemplate that the wood subjected to our process, whether sink-float or otherwise, will be green wood having a normal moisture content; under these conditions the continuous separation process is readily carried out on a practical basis without holding tanks or other time delay equipment as the separation with green woods takes place substantially immediately. In a sink-float process the springwood should be removed from the water before waterlogging, as efficiency decreases with time; but removal within 20 to 30 minutes gives full efficiency.

We have found that in practice where utilizing sink-float procedures moisture contents of 30 to 60% on total weight basis, the response is substantially immediate upon introduction to the water. Additionally, centrifugal separation is readily effected at these moisture contents in aqueous media. Since the fluidity is basically that of the media and fragments are relatively large, only very low input pressures to the centrifugal apparatus are needed— about 0.2 to 1 pound per square inch to attain the necessary velocity for separation, which separation is also immediate.

The splinters designated herein as substantially springwood and substantially summerwood are largely either springwood or summerwood but some small amount of summerwood may be included with the springwood, or some small amount of springwood may be included with the summerwood. Pulping of the individual fractions followed by microscopic examinations of the pulped materials have shown that total efficiency of the process is high. For example, in the sink fraction of the float-sink process described hereinbefore, 80–90% of the individual fibers and, in some cases, more than 90%, have been identified as summerwood. Similarly, in the float fraction 80–90% and more of the individual fibers are found to be springwood.

Coniferous woods which have been found specifically useful for the process at natural water contents are: slash pine, loblolly pin, shortleaf pine, longleaf pine, white fir, jack pine, tamarack, Virginiana pine, Australian pinus radiata; in fact, a plurality of such woods are commonly included together in the system described. In all cases, at least 80% of the fibers of the pulp formed from the fractions are either springwood or summerwood fibers and at times the percentage exceeds 90%. Curiously, the percentage noted is not significantly affected whether the woods subjected to the process are classed as having an abrupt transition from springwood to summerwood or otherwise.

In specific application, shortleaf pine has been subjected to the sequential steps of chipping, pressing and splintering followed by a sink-float step in water as described hereinbefore. In this instance a roll press was used for pressing to initiate cracking and a Vertiflex of E. D. Jones Corporation was used to effect the completion of the cracking through of the chips. Such shortleaf pine was at a normal moisture content of 51.2%. The oven dry weight per green volume of the original wood was 28.2 pounds per cubic foot. The summerwood fraction of the normal wood sank in water almost immediately while the springwood fraction floated. On an oven dry weight per green volume basis the springwood fraction was 52.3% of the whole and the summerwood fraction was 47.7%. The springwood fraction contained well over 80% of springwood fibers and the summerwood fraction well over 80% of summerwood fibers.

Similar results are achieved with the other mentioned woods and the wood employed may initially be in the form of logs, slabs, edgings and the like.

A screen analysis of softwood chips crushed and subjected to Vertiflex device as described provided the following noted fractions. The screening was made on a William Chip Classifier. The dimensions indicate the cross-sectional dimension of the fragments.

| Screen, inches: | Percent |
|---|---|
| 3/8 | 2.5 |
| 3/16 | 50.0 |
| 1/8 | 20.3 |
| 1/16 | 15.0 |
| 1/32 | 5.2 |
| Through 1/32 | 1.0 |
| | 100.0 |

These screen sizes indicate the cross-section dimension of the wood fragments.

The length of the fragments produced is not critical. They are of about the same length as the chips—matchstick size is usual terminology. Smaller length fragments may form, and this is dependent to some extent upon the impact of the pressed chips upon each other in the splintering or final fragmenting operation. Slight brooming may occur due to such impacts and such also causes the smaller cross-section dimensioned fragments. There is, however, no action which would fiberize the fragments to make them useful in a papermaking operation. Some form of fiberizing treatment—mechanical, chemical or semi-chemical—is required for this purpose.

Paper handsheets were produced from separate fractions of the springwood and summerwood. Each fraction was prepared separately by the same procedure, digestion being by the kraft process, the pulp then being flat screened and bleached. Beating times in the pulping process were as indicated below. The different characteristics imparted to the paper by the separate fractions are clearly evident.

The beating was carried out at 1.5% consistency at a pH of about 8.5 in a 1¼ pound Valley laboratory beater. The pulp was hand sheeted to a 44.2 pound basis weight (25" x 38" x 500 sheet ream). The hand sheeting equipment was an 8" x 8" Valley sheet mold.

|  | Beating Time | Canadian St. Freeness | Burst Factor Pts./100# | Tear Factor |
|---|---|---|---|---|
| Springwood fraction | 0 | 685 | 94 | 1.66 |
|  | 15 | 595 | 133 | 1.17 |
|  | 27 | 480 | 150 | 1.05 |
|  | 36 | 350 | 157 | 1.03 |
| Summerwood fraction | 0 | 770 | 19 | 1.80 |
|  | 17 | 640 | 99 | 2.20 |
|  | 25 | 565 | 109 | 2.09 |
|  | 33 | 370 | 121 | 1.78 |

Figure 2:
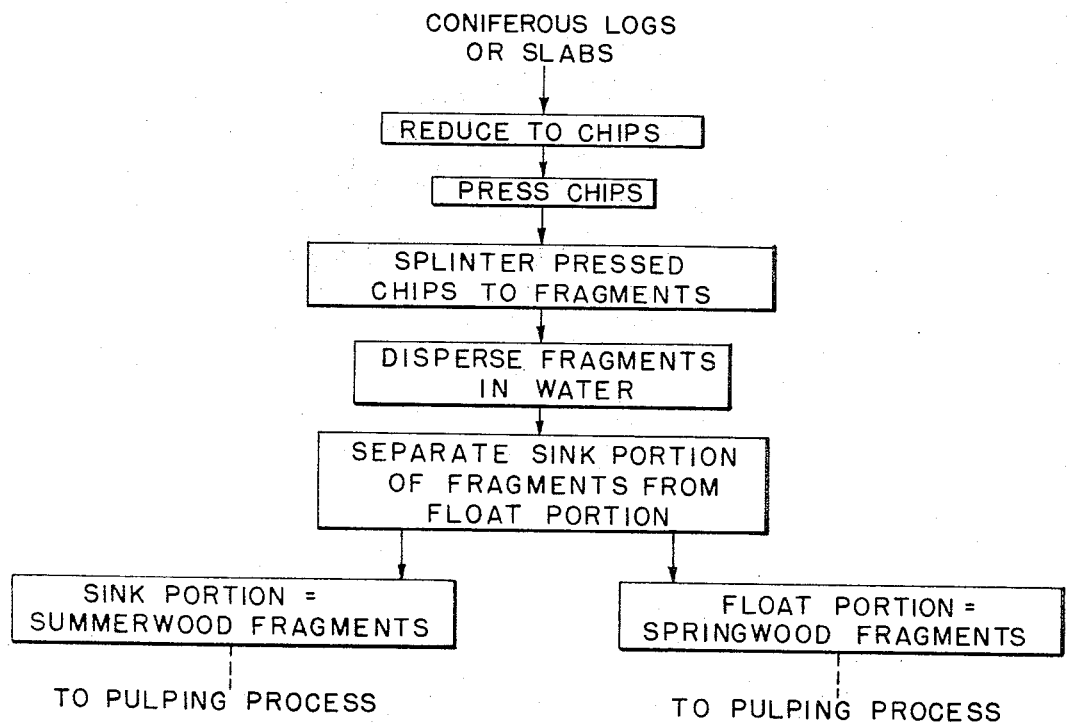
FIG. 2 is a flow chart setting forth preferred steps in carrying out the invention from the step of chipping a log through the separation step, the dotted lines indicating that the subsequent step of pulping is optional in the specific procedure.

Suitable fragments for separation are also obtained by the action of a coarse saw such as is employed as the head of a sawmill. This saw acting in the grain direction of the log of FIG. 1 cuts through adjacent springwood-summerwood layers as it squares off the log. The saw may be a band saw or a rotary saw. The slabs and edgings produced may be subjected to the chipping, pressing and splintering action (FIG. 2) already described to produce a mass of the mixed springwood-summerwood for separation. At the same time the action of the saw fragments out small particles of springwood and summerwood. Apparently many of these fragments are carved from the cleavage areas or planes as they are substantially of springwood or summerwood and therefore subject to separation by a sink-float step as noted. Such material is commercially termed coarse sawdust, the particle size being commonly in the ⅛" to ¼" range. Such material is readily separated into springwood and summerwood constituents by sink-float processes, and the separated constituents are then each subject to separate digestions for pulp purposes.

We believe our procedures and equipment arrangement to be new and practical, and we intend to claim the same broadly. In view of confusion of definitions in the literature and the application of broad definitions to mechanical effects in various publications we herein indicate applicable construction of our terminology as follows:

"Density" means the actual weight of a wood fragment divided by the fragment volume, including the weight of any water in the fragment (sometimes termed apparent density);

"Substantially" as applied to springwood and to summerwood fragments means that other than for moisture content of the wood anything in a springwood fragment other than springwood or in a summerwood fragment other than summerwood is not significant within the context of the separation process step described and claimed including the sink-float process step;

"Fiberizing" means to cause separation of fibers into a papermaking pulp;

"Essentially" as applied to "unfiberized" means that the fragments are necessarily in the form of wood, recognizable visually as such and distinct from the fiber state;

"Fragments" or to fragmentize relates to simple size reduction from an original material without substantial modification of the material of the fragment itself; such fragments are unsuitable for papermaking without a subsequent pulping procedure;

"Small" as applied to centrifugal force is meant sufficient force to effect separation and less than about 1 p.s.i.

The advantages of the separation described are clear. An important one is that each fraction may be pulped in a system designed specifically for either springwood or summerwood and with a particular end product in mind where the characteristic of the fibers may be best employed. The pulping process itself may be chemical, semi-chemical or mechanical. Also, blending of the pulp fibers may be effected in order to procure particular characteristics desired for any paper grade or quality. As will be noted, the separation step may be accomplished in any of a considerable plurality of modes of operation. The sink-float step is preferred but centrifugal separators, vortex systems and pneumatic rifflers as well as winnowing apparatus are useful to clarify the fragments on the basis of the known density relationships of springwood and summerwood.

It will be understood that this invention is susceptible to modification in order to adapt to different usages and conditions and, accordingly, it is desired to comprehend such modifications within the invention as may fall within the scope of the appended claims.

What is claimed is:

1. In a process in which coniferous wood is subjected to mechanical action including fragmentizing of the wood along natural lines of cleavage defining alternate layers of springwood and summerwood to reduce the wood to a mixed mass of individual fragments which are retained by a $\frac{1}{32}$ inch screen but pass a ½ inch screen and which fragments are substantially of either springwood or summerwood, the step of introducing the mass of wood fragments while they are at a moisture content in the range of about 30 to about 60% by weight based on the total wood weight into a body of an aqueous medium in which the fragments which are substantially of springwood float and the fragments which are substantially of summerwood sink.

2. In a process in which coniferous wood is subjected to mechanical action including fragmentizing of the wood along natural lines of cleavage defining alternate layers of springwood and summerwood to reduce the wood to a mixed mass of individual fragments which are retained by a $\frac{1}{32}$ inch screen but pass a ½ inch screen and which fragments are substantially of either springwood or summerwood, the step of introducing the mass of wood fragments while they are at a moisture content in the range of about 30 to about 60% by weight based on the total wood weight into a body of an aqueous medium intermediate the depth of the aqueous medium to immediately float springwood fragments upwardly toward the surface of the aqueous medium and to sink summerwood fragments downwardly in the aqueous medium.

3. In a process in which coniferous wood is subjected to mechanical action including fragmentizing of the wood along natural lines of cleavage defining alternate layers of springwood and summerwood to reduce the wood to a mixed mass of individual fragments which are retained by a $\frac{1}{32}$ inch screen but pass a ½ inch screen and which fragments are substantially of either springwood or summerwood, the steps of introducing the mass of wood fragments while they are at a moisture content of about 30 to about 60% by weight based on the total wood weight into a body of an aqueous medium in which the fragments which are substantially of springwood float and the fragments which are substantially of summerwood sink, and fiberizing at least some of one of the separated types of fragments by subjecting the fragments to a digesting operation whereby the fiberized material may be used for papermaking.

References Cited
UNITED STATES PATENTS

| 1,143,587 | 6/1915 | Marsden | 162—55 X |
| 1,818,897 | 8/1931 | Kumagawa | 162—55 |
| 3,085,927 | 4/1963 | Pesch | 162—55 |

DONALL H. SYLVESTER, *Primary Examiner.*

H. R. CAINE, *Assistant Examiner.*